Figure 1:
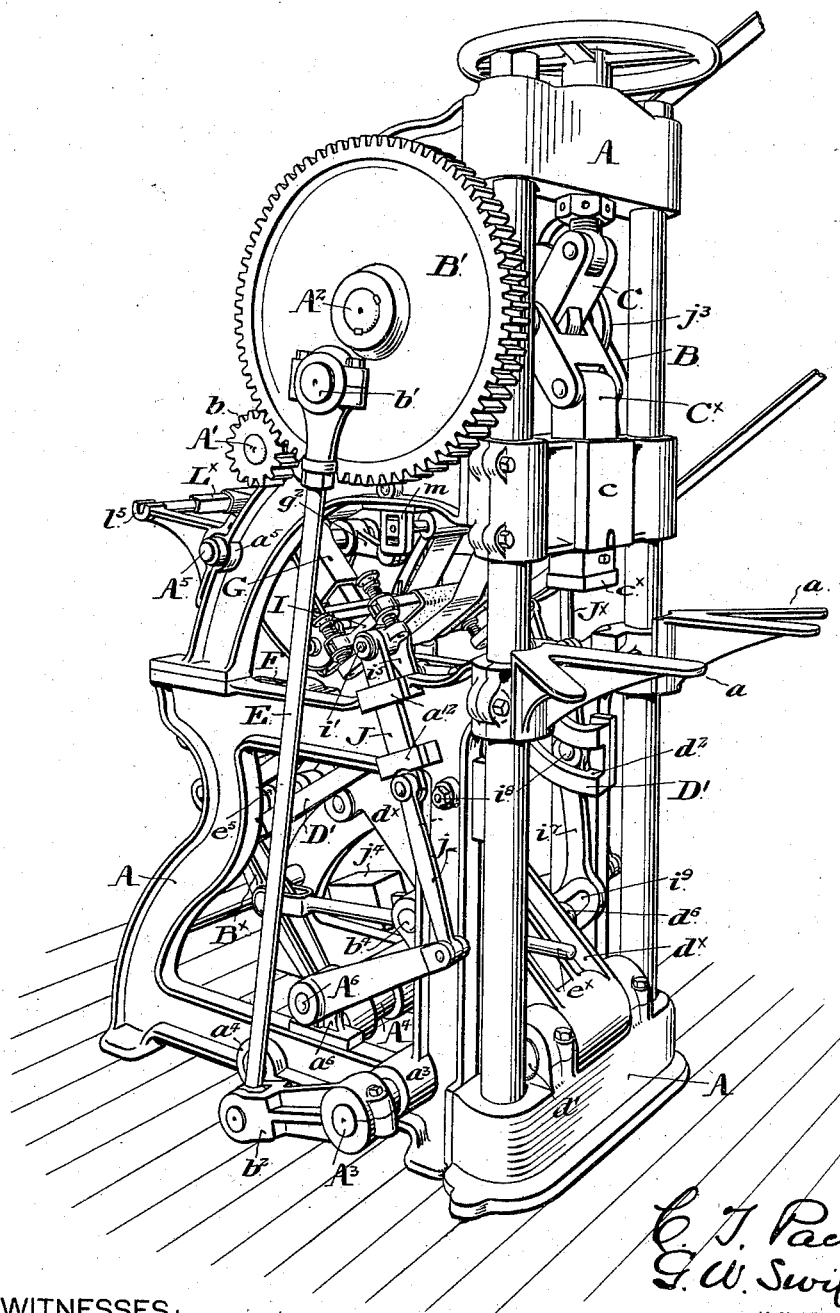

(No Model.) 9 Sheets—Sheet 1.

G. W. SWIFT, Jr. & C. T. PACKER.
EMBOSSING PRESS.

No. 558,860. Patented Apr. 21, 1896.

WITNESSES:
N. E. Paige
F. Norman Dixon

INVENTORS:
C. T. Packer
G. W. Swift Jr.
By their Attorneys,
Wm. C. Strawbridge
J. Bonsall Taylor

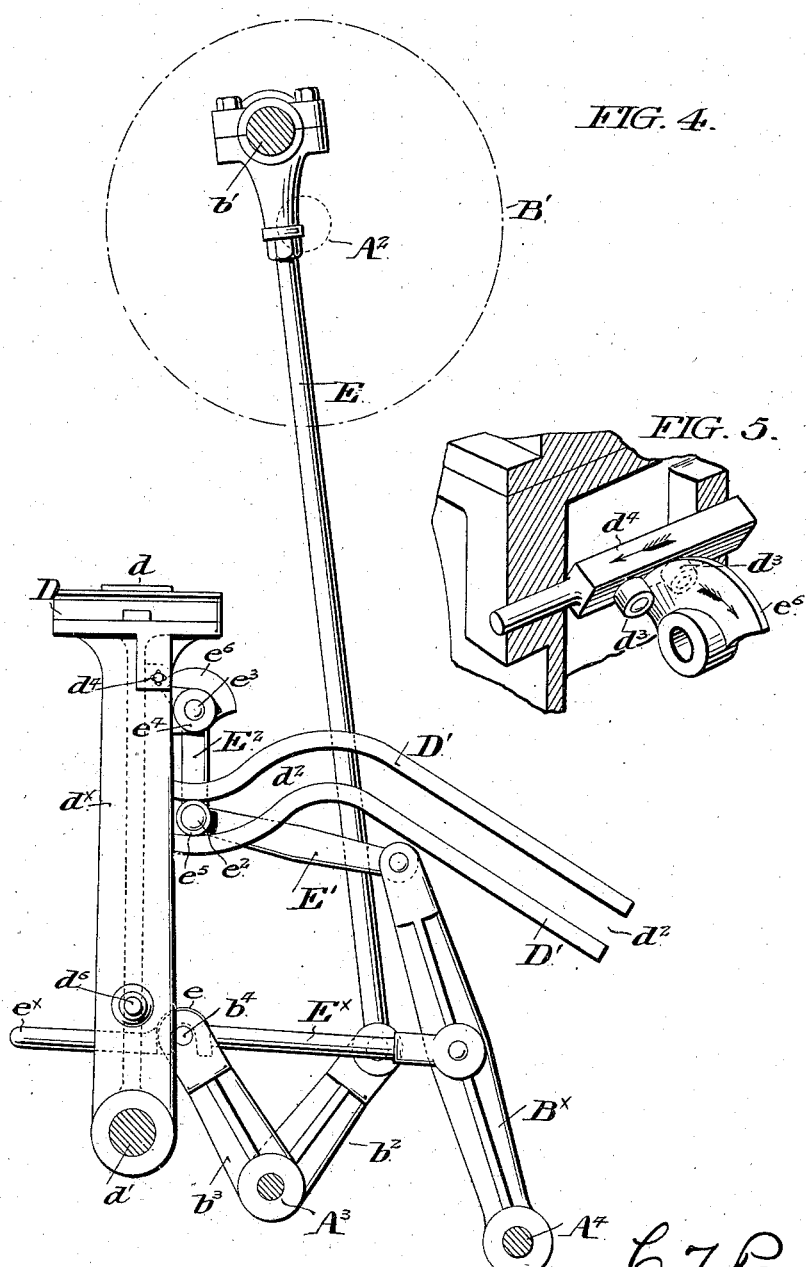

(No Model.) 9 Sheets—Sheet 5.

G. W. SWIFT, Jr. & C. T. PACKER.
EMBOSSING PRESS.

No. 558,860. Patented Apr. 21, 1896.

WITNESSES:
M. E. Paige
F. Norman Dixon

C. T. Packer
G. W. Swift Jr.
INVENTORS

By their Attorneys
Wm. C. Strawbridge
Bonsall Taylor

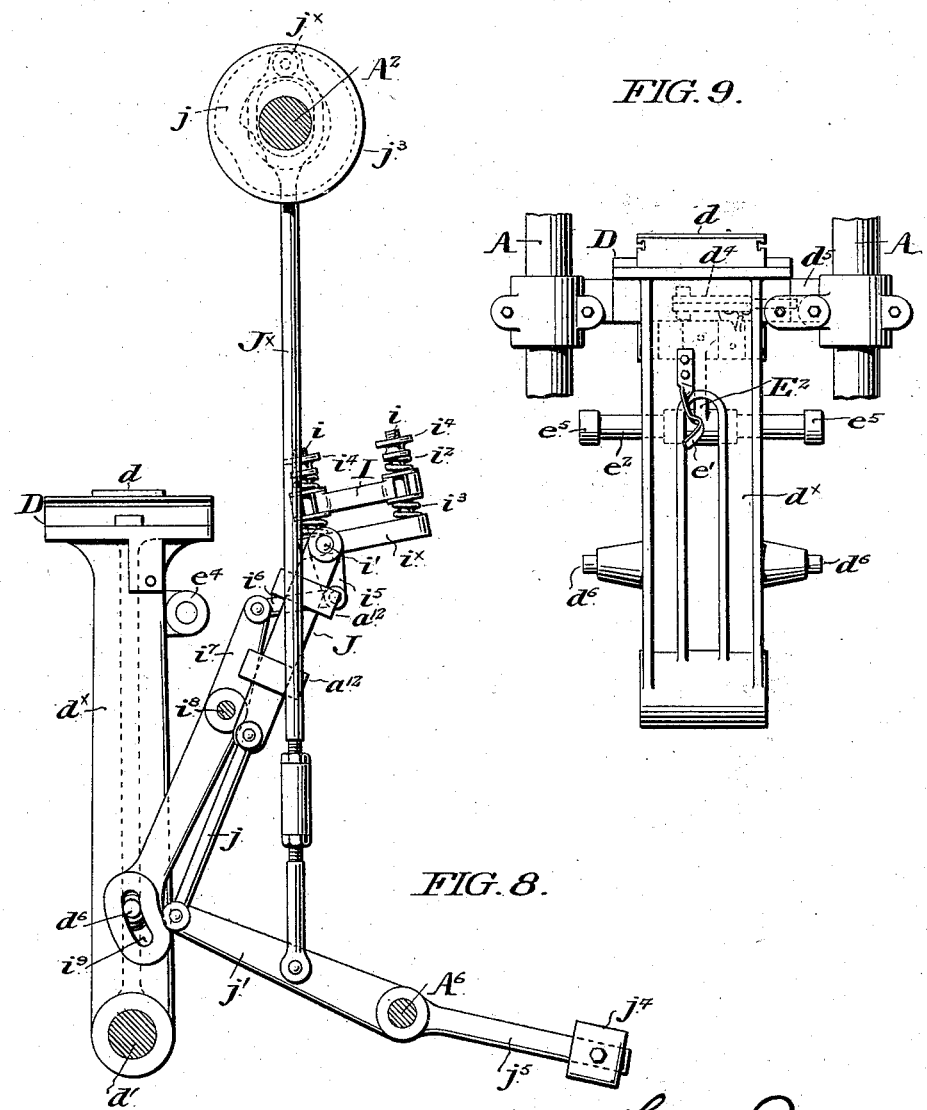

(No Model.) 9 Sheets—Sheet 7.
G. W. SWIFT, Jr. & C. T. PACKER.
EMBOSSING PRESS.
No. 558,860. Patented Apr. 21, 1896.
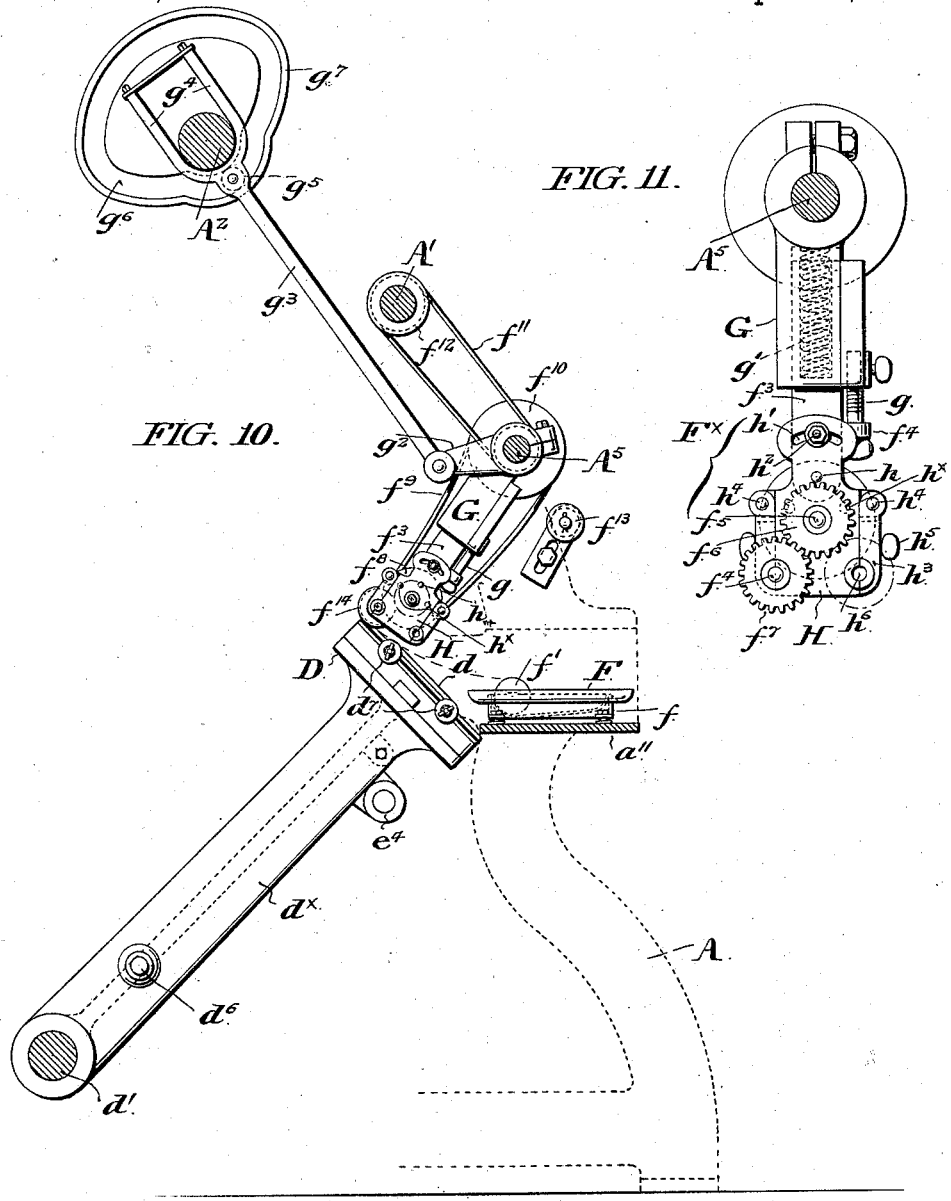
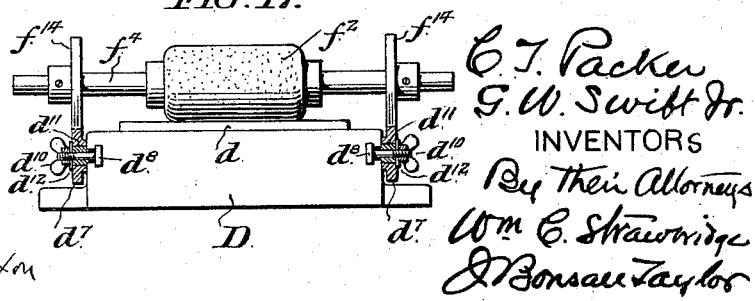
WITNESSES:
INVENTORS

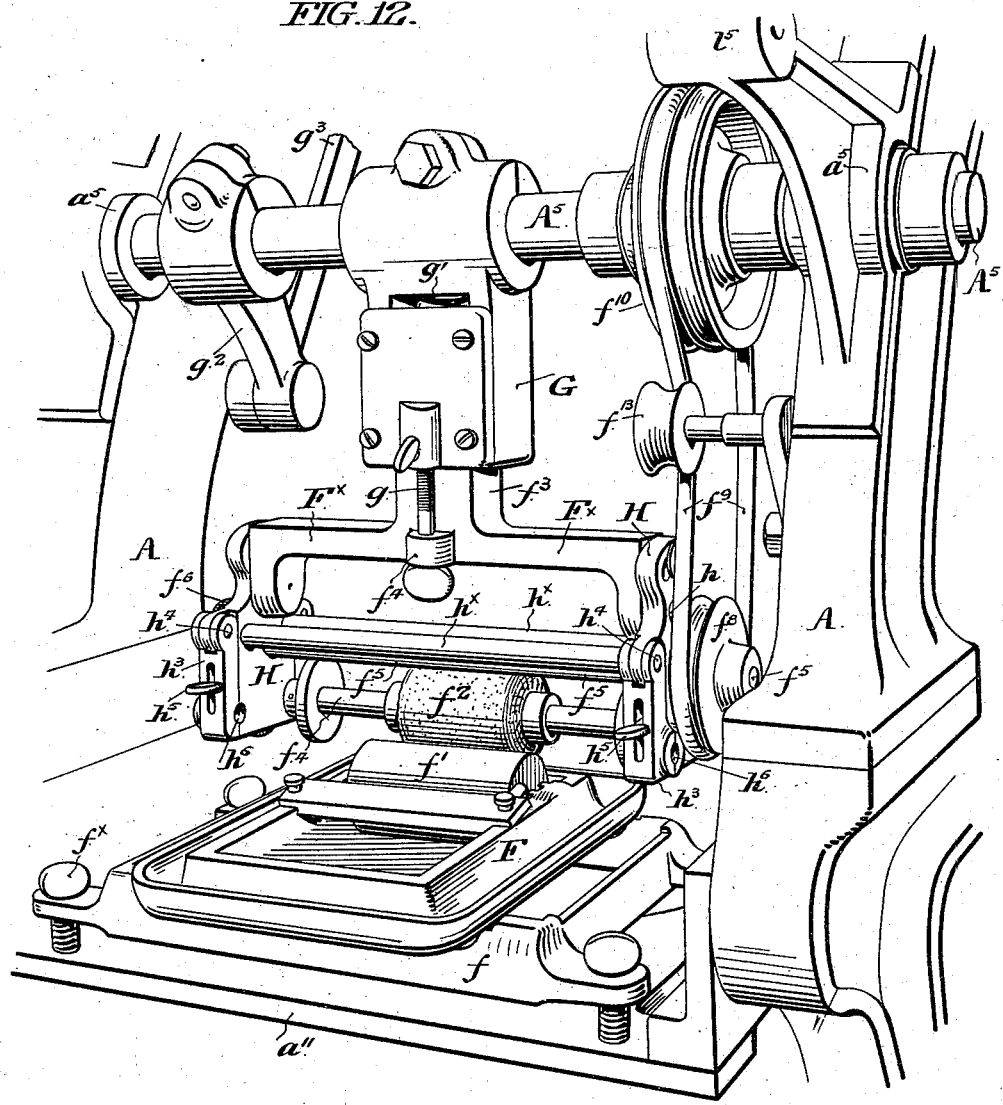

(No Model.) 9 Sheets—Sheet 9.

G. W. SWIFT, Jr. & C. T. PACKER.
EMBOSSING PRESS.

No. 558,860. Patented Apr. 21, 1896.

WITNESSES:
A. E. Paige
F. Norman Dixon

C. T. Packer
G. W. Swift Jr.
INVENTORS

By their Attorneys
Wm. E. Strawbridge
J. Bonsall Taylor

UNITED STATES PATENT OFFICE.

GEORGE W. SWIFT, JR., AND CHARLES T. PACKER, OF PHILADELPHIA, PENNSYLVANIA, ASSIGNORS OF ONE-HALF TO CEPHAS R. CARVER, OF SAME PLACE.

EMBOSSING-PRESS.

SPECIFICATION forming part of Letters Patent No. 558,860, dated April 21, 1896.

Application filed July 31, 1895. Serial No. 557,710. (No model.)

*To all whom it may concern:*

Be it known that we, GEORGE W. SWIFT, Jr., and CHARLES T. PACKER, citizens of the United States, and residents of the city and county of Philadelphia and State of Pennsylvania, have invented certain new and useful Improvements in Embossing-Presses, of which the following is a specification.

Our invention relates to embossing-presses in general, and particularly to such presses as are employed by stationers in embossing cards, letter-heads, and envelops; and it embodies certain improvements upon an embossing-press heretofore invented by us and forming the subject-matter of an application for patent filed in the United States Patent Office April 17, 1894, as Serial No. 507,862.

Presses of the character to which our invention relates embody certain fundamental elements—namely, a movable table or bed upon which one member of the die proper is superimposed, a reciprocating plunger which carries the other member of the die proper, and the reciprocation of which, in consonance with the predetermined correspondent movement of the bed, occasions the registry of the said members of the die and their embrace between them and the compression of the fabric to be embossed, a mechanism for applying ink to the member of the die carried by the bed, and a mechanism for wiping the face of said inked member of the die clean of surplus ink.

In combination with the foregoing fundamental instrumentalities various operating devices, adapted to impart the desired movements at the times desired and in the desired relation to the said instrumentalities, have been employed.

The machine which we have invented comprehends a combination or assemblage of co-operating instrumentalities, which, broadly considered, is not novel as a general combination, but embodies various improvements in the construction of the elements themselves and in their mode of application and operation, and various novel subcombinations of particular elements, all as herein described.

In the machine which forms the subject-matter of our application for patent above referred to the bed or table which carries the lower member of the die proper, which we hereinafter term the "die," is disposed and caused to reciprocate in a horizontal plane, being so operated as either to reciprocate in unison with the reciprocation of the plunger which carries the upper member of the die proper, and which we hereinafter term the "stamp," or else to dwell in registry beneath said plunger, so as to receive upon its die repeated or successive impressions from the stamp of the plunger. The dwell is occasioned by the operation of a lever mechanism with which is combined what we have termed a "cast-off link," to which, as hereinafter explained, we resort in the present machine. In the said machine the plunger carrying the stamp takes on its vertical reciprocation through the operation of a cam-actuated toggle-joint in a well-known manner. In the said machine, moreover, the ink-reservoir is carried upon and moved with the table or bed, so as to move beneath and supply ink to an inking-roller mechanism, which, after being supplied with ink from said reservoir, supplies it to the die upon the table as said die in the longitudinal movement of said table is caused to pass beneath it. In said machine, finally, the wiper mechanism, which wipes the die clean of surplus ink, is so operated as to make contact with the inked die in its forward movement to beneath the stamp and to be elevated from contact with said die upon the return movement of the table.

Special mechanisms for operating the foregoing instrumentalities and other devices, such as the continuous strip of paper or other fabric for performing the actual wiping, are set forth in our application referred to, to which reference may be made.

In the machine which forms the subject-matter of this specification, and which embodies the fundamental elements of our invention referred to, we dispense with the longitudinally-reciprocating table or bed and substitute in its stead an oscillatory bed, the table-surface of which is of such reduced area as to be sufficient only to carry the die and locate the ink-reservoir in the framework of the machine instead of upon the bed. We moreover arrange the inking-roller mechanism in such manner as to cause it to swing or oscillate from the fixed ink-reservoir to and into contact with the oscillatory bed. We further adapt the wiper mechanism to apply itself in appropriate parallelism with the planes of movement of the die of the oscillatory bed. We finally rearrange and reorganize the various motive devices of the foregoing instrumentalities in such manner as to compact, strengthen, and simplify the machine as an entirety.

Incidental to the foregoing organization are certain improvements in special devices, which, although less fundamental than the elemental devices of the machine, are important to its successful operation—as, for instance, a means for positively locking the oscillatory bed in its position beneath the plunger, a means for positively operating the rollers or roller of the ink-applying mechanism, a means for occasioning the positive and regulated feed of the wiping-strip, and a means for occasioning the predetermined movement of the wiper plate or platen relatively to the movement of the die carried by the oscillatory table.

A machine embodying a good form of our improvements is represented in the accompanying drawings and hereinafter described, the particular subject-matter claimed as novel being hereinafter definitely specified.

Figure 2:
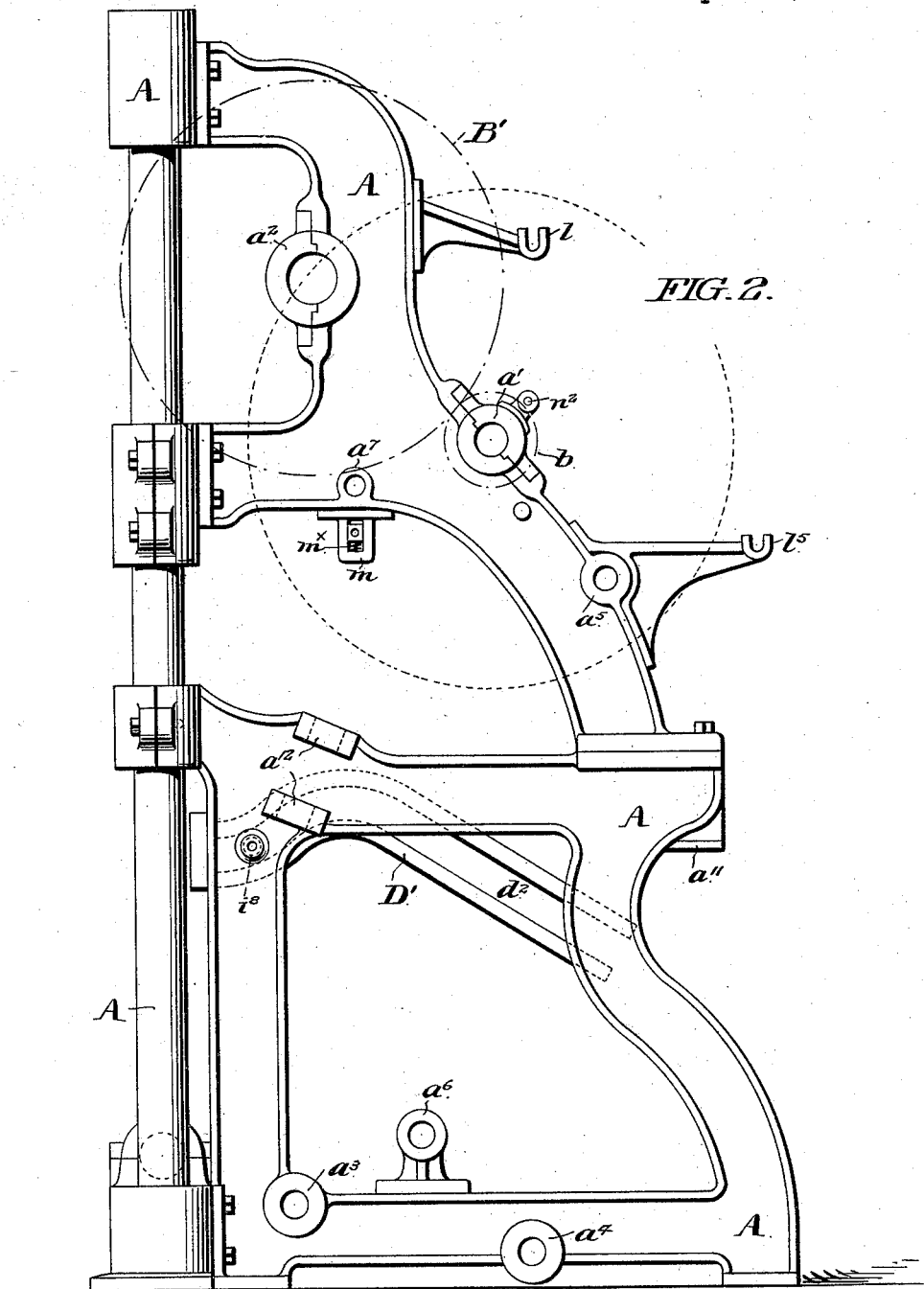
Figure 3:
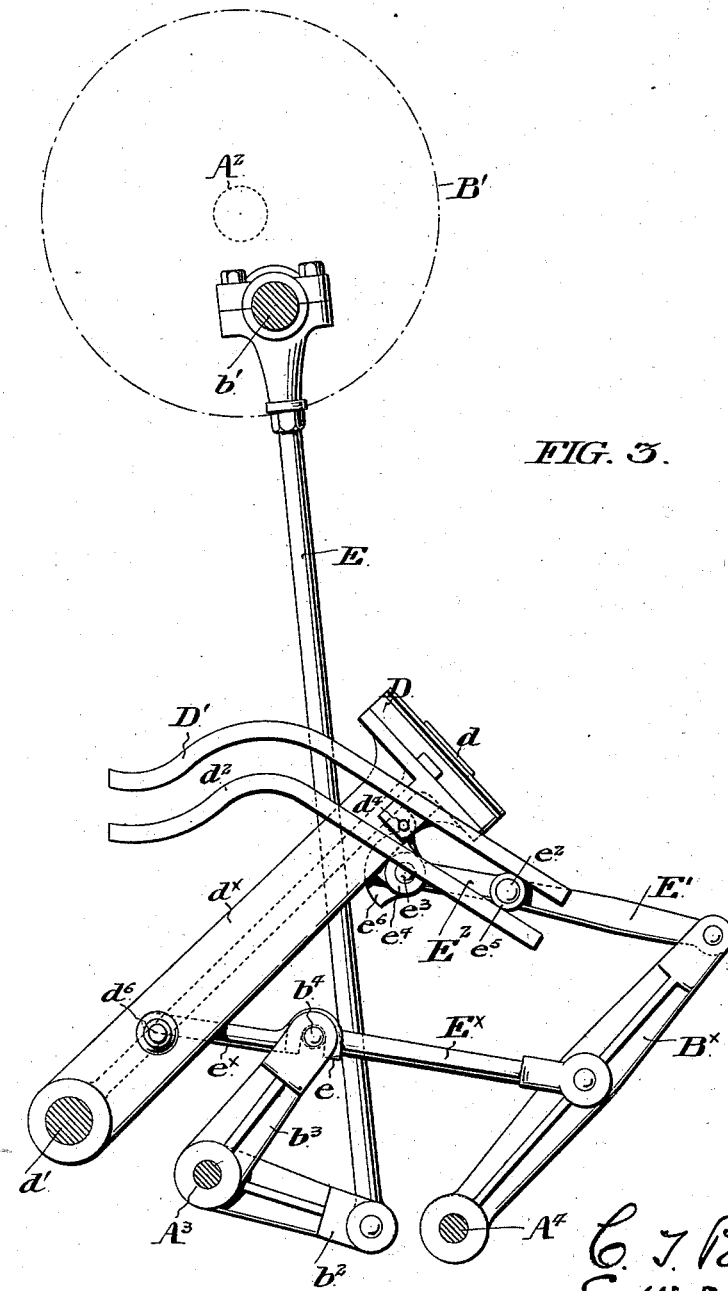
Figure 6:
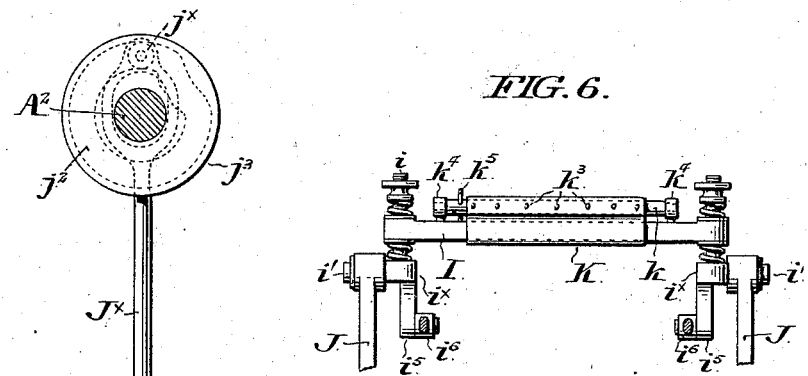
Figure 7:
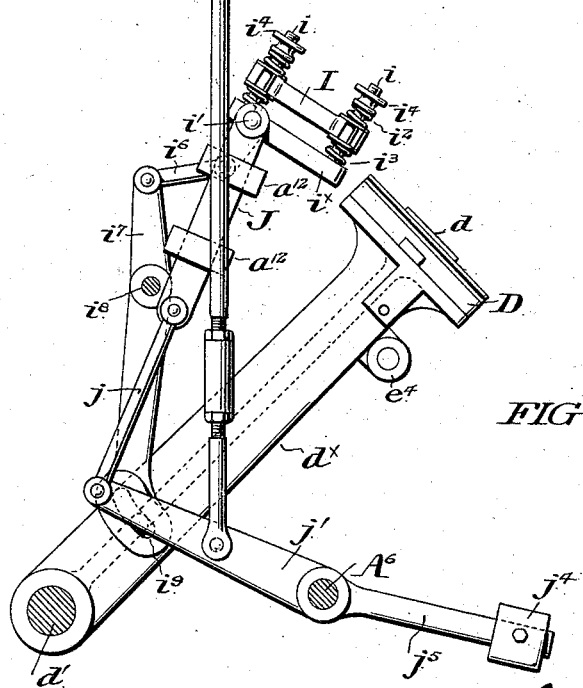
Figure 13:
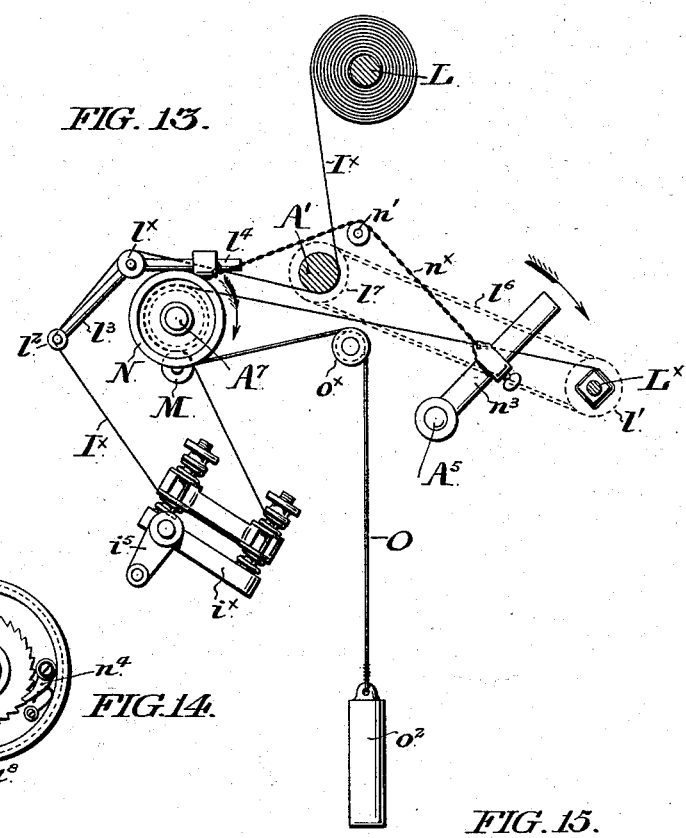
Figure 14:
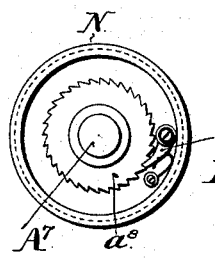
Figure 15:
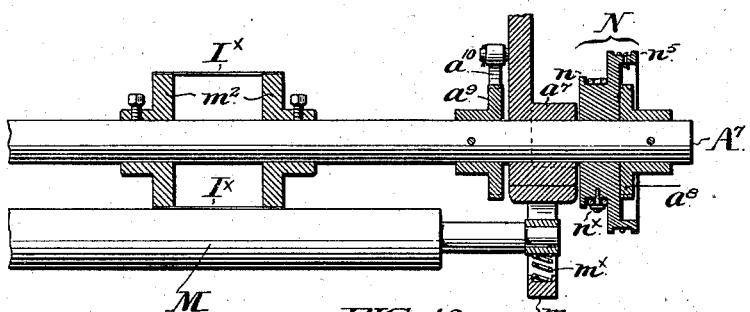
Figure 16:
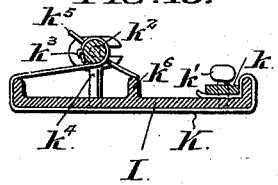

In the drawings, Figure 1 is a view in perspective of the entire machine. Fig. 2 is a side view of the framework of the machine with all the moving parts removed. Figs. 3 and 4 are side elevational detailed views of the die-carrying bed and standard, the camways for the link-guide shaft and of the mechanism for occasioning the oscillation of the bed and standard, the parts in Fig. 3 being represented in their first position and in Fig. 4 in their second position. Fig. 5 is a fragmentary perspective detail, partly in section, illustrative of the application of the locking-bolt to the standard of the bed. Fig. 6 is a fragmentary end elevational detail of the wiping-plate and the device upon which it is mounted. Figs. 7 and 8 are side elevational detail views of the bed-carrying standard of the device for occasioning the movement of the wiping-plate relatively to the die upon said bed, in Fig. 7 the parts being shown in the position which they occupy before action and in Fig. 8 after action. Fig. 9 is a front elevational view of the bed-carrying standard and bed, a portion of the framework and the link-guide shaft being also shown. Fig. 10 is a side elevational view of the bed-carrying standard and bed and of the ink-applying mechanism and the means for operating the same. Fig. 11 is a similar view of the frame which carries the ink-applying roller, and Fig. 12 a fragmentary perspective view from the rear of a portion of the framework of the machine of the ink-reservoir and of the ink-applying roller and the means for mounting the same. Fig. 13 is a side elevational view illustrative of the device for carrying and feeding a strip of wiping fabric with respect to the wiping-plate. Fig. 14 is a side elevational detail of the combination-drum. Fig. 15 is a longitudinal vertical sectional elevation through said drum, a portion of the framework, and the guard-ratchet for preventing backward rotation. Fig. 16 is a transverse sectional elevation through the wiping-plate, illustrating a convenient means for applying a felt cover to it. Fig. 17 is a front elevational detail of the oscillatory table or bed, showing the ink-applying roller, its journal, and the lifting-disks upon said journal, the view also representing the rolls applied to the bed for coöperation with the lifting-disks and the means for adjustably securing said rolls to said bed.

Similar letters of reference indicate corresponding parts.

A is the framework of the machine conveniently, although not necessarily, of the form and general construction represented in Figs. 1 and 2.

The press as an entirety is of the vertical type—that is to say, it is of greater height than breadth or depth. In its lower portion the oscillatory table, the mechanism for operating it, and the mechanism for operating the wiper are disposed. In its upper portion are assembled the plunger and the mechanism for operating it, the driving mechanism of the machine as a whole, the wiper-plate proper, the ink-applying mechanism, the devices for carrying and feeding the wiping-strip, and various minor appliances connected with the foregoing devices.

The ink-reservoir is supported at the rear of the framework approximately midway of the height of the same.

$a\ a$, Fig. 1, are brackets applied to the front portion of the framework for supporting an operative's table, (not shown,) to which the usual gages for securing the proper presentation of the paper or other fabric to be embossed are applied.

$A'$ is the driving-shaft, transversely disposed in the rear upper portion of the machine in suitable boxings $a'$. Upon the right-hand extremity, having regard to Fig. 1, of this shaft is mounted a driving-pulley B, (indicated in dotted lines in Fig. 2,) and upon the left-hand extremity is applied a driving-pinion $b$, engaged with a driving-spur or toothed crank-wheel $B'$, mounted upon the left-hand extremity of a crank-shaft $A^2$, transversely disposed in suitable boxings $a^2$ in the central upper portion of the machine. Upon this crank-shaft $A^2$ are the usual cams, which we have not deemed it necessary to illustrate, which operate the toggle-joint C, Fig. 1, which occasions the vertical reciprocation of the plunger $C^\times$, which carries the stamp or upper die $c^\times$, and which is housed for vertical movement in an appropriate bearing $c$ in the framework. Obviously the rotation derived from the driving-shaft and driving-pinion will, through the spur crank-wheel, occasion such requisite rotation of the crank-shaft as through the toggle-cams in the usual manner to occasion the vertical reciprocation of the plunger. Further description of this portion of the machine, which is not novel with us, is unnecessary.

D is the oscillatory table or bed, which carries the lower die $d$. This bed is supported upon a standard $d^\times$ of any preferred form—such, for instance, as is represented in Figs. 1, 3, 4, 7, 8, and 9—and which is journaled for oscillatory movement upon an axis, which we term the "die-axis" $d'$, in the base of the front portion of the framework. By virtue of this mounting the die-carrying table can be oscillated from the position shown in Figs. 1, 3, and 10 into that represented in Figs. 4, 8, and 9.

Many means for occasioning the oscillatory movement of the standard and table may be resorted to. We find it convenient to employ the following devices, which are essentially the same as those set forth in our pending application referred to:

E is a pitman, at its upper extremity boxed upon a crank-pin $b'$ on the spur crank-wheel $B'$ and at its lower extremity pivotally connected with a crank $b^2$ on a rock-shaft $A^3$, transversely disposed in suitable boxings $a^3$ in the base of the framework.

$b^3$ is a rocker-arm mounted upon said rock-shaft $A^3$, preferably midway of its length, the upper or free extremity of which is equipped with a transversely-extending link-pin $b^4$, with which a notch $e$ of a cast-off link $E^\times$ is adapted to be engaged. The cast-off link at its rear extremity is pivotally connected with what we term the "bed-rocker" $B^\times$, the same being a rocker-arm, at its lower extremity mounted for oscillatory movement upon a rocker-shaft $A^4$, transversely disposed in suitable boxings $a^4$ in the basal portion of the framework. At its forward extremity the cast-off link is formed as a handle $e^\times$, adapted to effect disengagement between the notch $e$ of said link and the link-pin $b^4$, and when disengaged to be temporarily retained out of engagement by the handle-catch $e'$, applied to the standard $d^\times$ of the bed, as shown in Fig. 9.

Obviously the throw of the pitman E in the revolution of the spur crank-wheel $B'$ will, through the crank $b^2$, rock-shaft $A^3$, rocker-arm $b^3$, and cast-off link $E^\times$, occasion the vibratory movement of the bed-rocker $B^\times$ relatively to its shaft $A^4$, with the result that the upper extremity of said bed-rocker will traverse an arc-shaped path forward and backward of the machine. The throw of this bed-rocker is utilized to occasion the oscillatory movement of the bed and its standard through the intervention of the double-link device $E'$ $E^2$. The rear member $E'$ of the said double link is pivotally connected at the rear with the upper end of the bed-rocker $B^\times$, and at the front is swiveled or pivoted upon a transversely-extending shaft, which we term the "link-guide" shaft $e^2$, Figs. 3, 4, and 9, upon which shaft the rear end of the front member $E^2$ of the double link is also pivoted to take on any such throw as the movement of said bed-rocker $B^\times$ may impart. At its outer or front extremity the front member $E^2$ of the double link is keyed upon what we term a "bolt-shaft" $e^3$, transversely extending to the rear of the standard of the bed through bolt-shaft boxings $e^4$, applied to said standard. The link-guide shaft $e^2$ is, as to its extremities, conveniently provided with anti-friction-rolls $e^5$, Figs. 3, 4, and 9, which are adapted to travel within cam-slots $d^2$, formed in camways D', applied to the respective opposite inner side frames of the framework upon each side of the bed-standard. As will be apparent from an inspection of Figs. 2, 3, and 4, these cam-slots are as to the rear portion of their length straight, but as to their forward portion form a sigmoid curve, the radius of the front portion of which is equal to the distance between the centers of the link-guide shaft $e^2$ and bolt-shaft $e^3$.

Assuming the normal position of the parts to be that represented in Fig. 3, the forward throw of the bed-rocker, the double-link members being for the time being straightened nto line, will occasion the forward throw of the bed and standard into the position represented in Fig. 4, and the curved portion of the cam-slots of the camway at the completion of the throw of the rocker-arm will occasion the deflection of said link members into the position represented in Fig. 4, a deflection which will be accompanied by a given rotary movement of the bolt-shaft $e^3$, and which will permit of the dwell of the bed during the period of the descent of the plunger.

The foregoing mechanism, apart from its combination with the oscillatory bed, is not the subject of any claim herein, as it is claimed in our application for patent above referred to.

In order to lock the bed and standard in the position represented in Figs. 4, 8, and 9, to occasion the accurate registry of the die with the stamp of the plunger, we have devised a positively-operating lock of the following description:

$e^6$ is the segment of the helix, or what we term a "helical feather," keyed upon the bolt-shaft $e^3$, as shown in Figs. 3, 4, 5, and 9, which, in the application of the bolt-shaft to its boxings $e^4$ in the standard of the bed, is entered between two lugs, preferably formed as rollers $d^3$, mounted upon a transversely-disposed sliding bolt $d^4$, housed in suitable slide-bearings with respect to the standard, and adapted when moved in the direction of the arrow represented in Fig. 5 to enter a bolt-keeper $d^5$, Fig. 9, formed in a portion of the framework of the machine.

The rotation of the bolt-shaft $e^3$, which takes place upon the deflection of the front member $E^2$ of the double link into the position represented in Fig. 4, occasions through the helical feather the shooting of the bolt, and the rerotation of said bolt-shaft, occasioning the reverse movement of the feather, occasions the retraction of the bolt.

As is obvious, the foregoing lock acts positively at the proper moment to lock the bed and die in their vertical position, and to subsequently unlock them and free them for their return movement.

F, Figs. 10 and 12, is an ink-reservoir of any preferred construction, supported upon a frame $f$, adjustably applied to a transverse ledge $a''$, forming a part of the framework. The reservoir-frame is conveniently vertically adjustable by means of the adjusting-screws $f^\times$, Fig. 12. Transversely disposed with relation to the reservoir is an ink-supplying roller $f'$, adapted to run idly with a portion of its surface submerged within the ink.

The ink-applying mechanism which takes the ink from the ink-roller of the reservoir and supplies it to the sunken or intaglio portions of the die consists, essentially, of a cylindriform ink-applying roller or brush $f^2$, mounted in an oscillatory inking-frame $F^\times$, Figs. 10, 11, and 12. This inking-frame is conveniently composed of a yoke or head, to which the letter $F^\times$ is directly applied, and of an extension $f^3$ or carrying-arm adapted to fit within a depending socket G, mounted upon a rock-shaft $A^5$, which we term the "socket-shaft," transversely disposed in the framework in suitable boxings $a^5$. The extension $f^3$ is conveniently retained within said socket—that is to say, prevented from falling out of it—by a retaining-screw $g$ applied to said socket, as shown in Figs. 10, 11, and 12, and relatively to which said extension or carrying arm may move upwardly against the depressing thrust of a spring $g'$, contained within said socket, under the control of an apertured lug $f^4$, through which the head portion of the retaining-screw $g$ passes. Obviously, the oscillation of the socket rock-shaft $A^5$ will occasion the oscillation of the inking-frame and the consequent throw of the ink-applying roller either over and in contact with the ink-supplying roller or over and in contact with the die upon the bed in the throw of the latter with its standard. The desired oscillation of the said socket-shaft $A^5$ may be performed by many devices. We find it convenient to perform it by the devices shown in Figs. 10 and 12, and which consist of a rocker $g^2$ on the socket-shaft $A^5$ and the rocker-pitman $g^3$, which at its lower end is pivotally connected to said rocker $g^2$, and at its upper end is bifurcated to form a yoke $g^4$, which straddles the crank-shaft $A^2$, and the fork-head of which yoke is provided with a cam-roller $g^5$, adapted to a camway-race $g^6$, formed in a cam $g^7$, Fig. 10, applied to said crank-shaft.

The oscillatory inking-frame $F^\times$ is itself provided with a pivotally-applied roller-carrying frame composite of two side plates H H, pivoted by the pivots $h$ to said connecting-frame and connected together by frame-bars $h^\times$, and between which is housed the journal $f^4$ of the ink-applying roller $f^2$. Upon each edge of the journal $f^4$ are mounted two fixed disks, which we call the "lifting-disks" $f^{14}$, because, by their encounter with the pairs of rolls $d^7$, fixed upon the sides of the oscillatory bed, they serve to effect the lifting of the entire inking-frame $F^\times$ and its ink-applying roller $f^2$ against the normal resistance of the depressing-spring $g'$, and so serve to occasion the clearance of the ink-applying roller with respect to the edges of the die, with the result that the deposit of ink to the front and rear of the die is prevented.

As will be understood from Figs. 10 and 17, the rolls $d^7$ are mounted in corresponding pairs, respectively, a little beyond the front and rear edges of the die, and they therefore serve to effect the lifting of the ink-applying roller at the instant when it arrives at the front edge of the die and at the instant when it leaves the rear edge of the die, permitting the travel of the roller only across that portion of the face of the die which contains the engraved design.

Many means of applying the rolls to the bed may be resorted to. We find it convenient, in order to adapt the rolls for adjustment for use with dies of different breadths, to resort to the following devices:

$d^8$ are bolts the heads of which are adapted to be entered within longitudinally-extending rabbets $d^9$ or sunken ways formed in the sides of the table or bed. The outwardly-projecting threaded extremities of these bolts are provided with thumb-nuts $d^{10}$, which serve, when tightened, to clamp against the sides of the table hollow bushings or journals $d^{11}$, mounted upon the shanks of the bolts, and upon which are in turn mounted the rolls $d^7$, which revolve upon said bushings and are prevented from moving outwardly against the thumb-nuts by the interposition of washers $d^{12}$, also mounted on the bolts. Obviously, as the rabbets extend the lengths of the sides of the bed, by loosening the thumb-nuts and moving the bolts longitudinally the rolls can be set by pairs at the opposite edges of dies of different widths. In parallelism with and above said journal $f^4$ is a gear-shaft $f^5$, also journaled in the side plates H H of said roller-carrying frame. One extremity of this gear-shaft is equipped with a toothed pinion $f^6$, which meshes with a counterpart toothed pinion $f^7$ in a corresponding extremity of the journal $f^4$ of the ink-supply roller. The other extremity of said gear-shaft $f^5$ is equipped with a pulley $f^8$, over which runs a belt $f^9$ from a driving-pulley $f^{10}$, mounted to run idly on the socket-shaft $A^5$, and which idle-pulley is driven by a driving-belt $f^{11}$, which receives its own positive motion from a motor-pulley $f^{12}$ on the driving-shaft $A'$ of the machine.

$f^{13}$ is an idle-pulley fixedly secured to the framework, as shown in Figs. 10 and 12, which we term the "belt-tightening" pulley, because its function is to intermittently tighten the belt $f^9$.

It being a desideratum that the ink-applying roller should be positively driven when it is in contact with the idly-running ink-supplying roller, and should run idly when it is in contact with the die, the driving-belt and gear devices above described will operate to accomplish this desirable result, for, as is obvious, when the ink-applying roller and its carrying-frame are in the positions represented in Fig. 12 and in contact with the ink-supplying roller, the driven belt $f^9$ will be in contact with the belt-tightening pulley $f^{13}$ and be by it rendered so taut as to drive the pulley $f^8$ on the gear-shaft $f^5$, and consequently, through said shaft and the intermediate pinions $f^6$ $f^7$, drive the journal $f^4$ and ink-applying roller $f^2$; whereas, when the said ink-applying roller and frame are in the position represented in Fig. 10 and the roller in readiness, upon the forward movement of the die and standard, to supply said die with ink, the driven belt will be out of contact with the belt-tightening pulley, and by virtue of its normal slack will fail to drive the pulley $f^8$, and consequently the ink-applying roller, which will therefore run idly under the travel of the die beneath and under it.

In the last-mentioned action—that is to say, in the travel of the die under the ink-applying roller—sunken portions of the die will be thoroughly filled with ink.

In order to permit of any desired slight lateral adjustment of the roller-carrying frame H H with reference to the oscillatory inking-frame $F^\times$, the plates H are extended upwardly beyond their pivots $h$ and formed with segmental adjusting-slots $h'$, through which adjusting-screws $h^2$, threaded into the inking-frame, pass, as shown in Fig. 11. In order, moreover, to permit of the adjustment of the ink-applying roller to either the front or back sides of the roller-carrying plates H, said plates are provided with what we term "split bearing-blocks" $h^3$, Fig. 11, hinged at $h^4$ to said plates H, but controlled by locking-screws $h^5$, threaded into said plates. By means of these blocks two sets of split journal-bearings $h^6$ are formed, into either of which, as is obvious, the journal $f^4$ of the ink-applying roller may be entered, the toothed pinions $f^6$ and $f^7$ being, in either position of said journal, in appropriate and corresponding engagement.

The wiper mechanism is of the following organization: Premising that the wiper-plate or platen which we employ is substantially of the same construction as the wiper-plate described in our pending application for patent, it is necessary in our present machine to so mount and move it as to cause its flat under surface, over which the strip of wiping-paper is led, to conform to and remain in parallelism with the planes assumed by the flat upper surface of the die during the movement of the latter in the arc of a circle beneath said plate, and this we accomplish by pivotally mounting the plate and positively manipulating it in the following manner:

I is the wiper-plate proper, the same being a plate which, as shown in Figs. 1, 6, 7, 8, 13, and 16, is at its four corners mounted for vertical movement upon carrying-studs $i$, which are by pairs erected from stud-carrying bars $i^\times$, pivotally mounted, by means of the pivot-pins $i'$, on the upper extremities of the wiper slide-bars J, adapted to slide through slide-bearings $a^{12}$, applied to the side frames of the framework, as shown in Fig. 1, and which bars are adapted to be raised and lowered to raise and lower the wiper-carrying studs and wiper-plates by being connected by link-bars $j$ with link-bar rockers $j'$, keyed upon a rock-shaft $A^6$, transversely disposed in suitable boxings $a^6$ in the base of the framework.

$J^\times$ is a depressing-rod pivoted at its lower extremity to one of the link-bar rockers $j'$, and at its upper extremity provided with a cam-roller $j^\times$, adapted to a camway-race $j^2$ in what we term a "wiper-cam" $j^3$, mounted upon the crank-shaft $A^2$. The conformation of the raceway of this cam is such that at the appropriate times the depressing-rod is driven downward and drives down the link-bar rockers $j'$, so as, through the link-bars $j$ and the wiper slide-bars J, to draw down the wiper-carrying devices and wiper. The elevation or return of the parts above named is aided by the operation of a counterbalance-weight $j^4$ on a counterbalanced arm $j^5$ on the rock-shaft $A^6$.

$i^3$ are a set of spiral springs, respectively surrounding the wiper-carrying studs $i$ between the wiper-plate and the stud-carrying bars $i^\times$, and $i^2$ are a similar set of spiral springs surrounding said studs above the wiper-plate and between it and a set of adjusting-nuts $i^4$, respectively applied to said studs.

By means of the springs aforesaid, the tension of which can be regulated by the nuts, the wiper-plate is cushioned against all shock and jar.

As, in addition to the up-and-down movement performed by the devices above described, it is necessary to conform its surface to the planes of movement assumed by the die, to impart to the wiper-plate a tilting movement, we apply to the stud-carrying bars $i^\times$ of said plate depending-bar lugs $i^5$, the lower ends of which are pivotally connected by links $i^6$ to the upper extremities of rocking levers $i^7$, which are intermediately of their length pivoted at $i^8$, and which as to their lower extremities embody segmental slots $i^9$, within which are entered lever-pins $d^6$, Fig. 9, formed in the sides of the standards $d^\times$ of the bed.

In the oscillatory movement of the standard from the position represented in Fig. 7 to that represented in Fig. 8 the lever-pins $d^6$ will, through their play in the slots $i^9$ of the rocking levers $i^7$ and through the links $i^6$ and lugs $i^5$, occasion such a tilting or deflection of the wiping-plate as will cause it to remain in parallelism with the upper surface of the die throughout the throw of said die and its standard beneath said plate.

The wiper-plate proper (designated $l$) is shown in detail in Figs. 6 and 16, and is preferably composed of a flat plate of metal, to which the letter $l$ is directly applied, and beneath the under surface of which, as already explained, the wiping-strip $l^\times$ passes.

In order to occasion the effectual operation of the aforesaid wiping-strip, we prefer to apply to the wiping-plate a covering K, of felt or other compressible elastic material, and this we conveniently do in the manner illustrated in Figs. 6 and 16—that is to say, we attach to the plate one end of a strip of felt by means of a securing-bar $k$, extending longitudinally of the plate and connected thereto by screws $k'$, threading into the body of the plate, and then secure the other end of said strip, under suitable tension imparted to the entire strip, by wrapping it around a tension-roller $k^2$, equipped with a series of engaging-hooks $k^3$ or similar contrivances, by which the end is fastened, and which roller is itself adapted to be rotated within bearings $k^4$, erected for it upon the plate, by means of a twisting-pin $k^5$, adjustably applied to it, conveniently by being passed through a diametrical hole in it, as shown, and one end of which pin is sprung over a retaining-ledge $k^6$ on the plate.

Other contrivances may of course be resorted to in the place of those above described.

The wiping-strip $l^\times$, which wipes the surplus ink off of the lower die, and which, as stated, is passed beneath the under surface of the wiping-plate, may be applied and fed forward in many ways. We find it convenient to resort to the devices especially illustrated in Figs. 13, 14, and 15, which satisfactorily answer the purpose.

L is a supply-roller upon which the wiping-strip is originally rolled and which is transversely disposed in the framework in boxings $l^5$, Fig. 2. From this supply-roller the wiping-strip is led preferably beneath the driving-shaft A' and thence over the transversely-disposed rocking axis $l^7$ of a tension-frame conveniently composed of a transverse cross-bar $l^2$, supported in carrying-arms $l^3$, springing from said rocking axis $l^7$, and of a counterbalancing-arm $l^4$, likewise springing from said axis. From the tension-frame the strip is led beneath the wiping-plate, and thence upwardly and forwardly, as shown in Fig. 13, to between a tension-roller M, preferably disposed in suitable boxings $m$ in the framework, and which, as shown in Fig. 2, is under the constant pressure of upwardly-acting compressed spiral springs $m^\times$, and a pair of pressure-rolls $m^2$, or a single continuous roll, the obvious equivalent therefor, upon a feed-shaft $A^7$, transversely disposed in the framework in suitable boxings $a^7$, and which is actuated by suitable devices, conveniently the ratchet and drum devices hereinafter described, to occasion the intermittent forward feed of the wiping-strip, which latter, after passing completely over the pressure-rolls, is led backward to a winding-up roller $L^\times$, transversely disposed in the framework and supported in boxings $l^5$, Figs. 1 and 2.

The actuation of the winding-up roll $L^\times$ is conveniently effected by the frictional grasp of a constant-running friction-belt $l^6$, Fig. 13, mounted on a belt-pulley $l'$ on said winding-up roller and on a counterpart belt-pulley $l^7$ on the driving-shaft A'.

The supply-roller L being free to unwind as the wiping-strip is pulled from off it, the winding-up roller being positively revolved to take up the unwound strip after it has pursued the path above described, and the slack of the strip being at all times taken up by the counterbalanced tension-frame, the positive intermittent forward feed of said strip is occasioned by the operation of the pressure-rolls $m^2$ on the feed-shaft $A^7$, acting in association with the tension-roller M in the positive intermittent rotation of said feed-shaft, which is occasioned by the following devices: The feed-shaft $A^7$, which, as stated, is housed in the boxings $a^7$, is, as shown in Figs. 14 and 15, provided with a feed-drum N, mounted loosely—that is to say, for free revolution—upon it. This drum has two peripheral surfaces of different diameters, the smaller of which, which we term the "chain-surface" $n$, has attached to it the feed-operating chain $n^\times$, which is carried conveniently over a directing-pulley $n'$, housed on a pin $n^2$, fixed on the framework to a chain-rocker $n^3$, mounted on the socket-shaft $A^5$ and adapted to perform a given throw in consonance with the oscillatory movement of said shaft hereinbefore described. Obviously the throw of the chain-rocker in the direction of the arrow in Fig. 13 will occasion the backward rotation of the feed-drum in the direction of the arrow applied to it. If this rotation of the drum be imparted to the feed-shaft to occasion its rotation also, the strip will be fed forward. To this end we therefore fix upon said feed-shaft $A^7$ a ratchet-wheel $a^8$, with which a spring-controlled pawl $n^4$ on the side faces of the feed-drum engages, and thereby accomplish the desired result. Upon the return throw of the chain-rocker $n^3$ the feed-operating chain is manifestly slackened, and in order to secure the return of the feed-drum, upon which the chain for the time being exerts no tension, we apply conveniently to a surface of greater diameter upon the drum, which we term the "cord-surface" $n^5$, a cord O, connected with said surface, conveniently led over a directing-pulley $o^\times$ pendent therefrom and provided with a returning weight $o^2$. The power of the chain-rocker is, of course, such as in its operative throw to overcome the resistance of the weight.

In order to prevent the possible reverse rotation of the shaft during the return of the feed-drum above described, we apply to the feed-shaft a guard ratchet-wheel $a^9$, which is in engagement with a guard-pawl $a^{10}$, applied to the framework, as shown in Fig. 15.

Although we have herein illustrated and referred to certain devices which are incorporated in our application for a patent filed April 17, 1894, as Serial No. 507,862, hereinbefore referred to, we do not in this application lay claim to any such subject-matter claimed in said application, or which forms the subject-matters of a certain interference now pending between the said application and a certain application of Samuel Steen, Jr., but confine our invention to the subject-matter set forth in the following claims.

Having thus described our invention, we claim—

1. In an embossing-press, the following elements in combination: an oscillatory die-carrying standard; means for occasioning the predetermined movement of said standard; an ink-reservoir fixed upon the framework of the machine; a normally-idle oscillatory ink-applying roller; means for occasioning the oscillation of said roller from the reservoir to across the face of the die; and a driving mechanism directly applied to and operative upon said ink-applying roller for occasioning the positive rotation of said roller during the period of its application to the ink-reservoir; substantially as described.

2. In an embossing-press, the following elements in combination: an oscillatory die-carrying standard, means for occasioning the predetermined movement of said standard; an ink-reservoir fixed upon the framework of the machine; an oscillatory ink-applying roller; means for occasioning the oscillation of said roller from the reservoir to across the face of the die; a wiping-plate beneath the wiping-face of which a wiping-strip is caused to travel; and means, essentially such as set forth, for imparting to said plate such a compound up-and-down and tilting movement as will occasion the presentation of said plate in planes parallel with the planes of movement of the die during the period of the movement of said die beneath said plate; substantially as described.

3. In an embossing-press, the following elements in combination: an oscillatory die-carrying standard; means for occasioning the predetermined movement of said standard; an ink-reservoir fixed upon the framework of the machine; an oscillatory ink-applying roller; means for occasioning the oscillation of said roller from the reservoir to across the face of the die; a plunger adapted to operate in conjunction with the die of the standard; and means for positively locking the standard and die for registry beneath the plunger during the period of the impressing action of said plunger; substantially as set forth.

4. As a means for positively locking the die-carrying standard in position to receive the stroke of the stamp of the plunger, the bolt applied to and carried by said standard and provided with lugs or rollers, the helical feather applied to the bolt-shaft, the double link, and means, essentially such as set forth, for operating said double link to occasion the rotary movement of the feather and the shooting of the bolt; substantially as described.

5. As a device for imparting to the wiper-plate the compound movement hereinbefore described, the combination of the wiper slide-bars, the link-bar rockers, the compressing-rod, the rocking levers linked to the plate and provided with segmental slots in their lower extremities, and the lever-pins on the oscillatory standard for occasioning the predetermined throw of said rocking levers, substantially as set forth.

6. In combination to form a frame for carrying the ink-applying roller and for occasioning the oscillation of said roller from the ink-reservoir to across the face of the die, the oscillatory frame $f^\times$ provided with the segmental frame-plates H and adjustably secured within the socket G fixed upon the oscillatory rock-shaft, and means for securing the predetermined oscillation of said shaft, substantially as described.

7. The combination to form a frame for carrying the ink-applying roller and for occasioning the oscillation of said roller from the ink-reservoir to and across the face of the die, of the oscillatory frame $f^\times$ provided with the segmental frame-plates H and adjustably secured within the socket G fixed upon the rock-shaft to which a movement of predetermined oscillation is imparted, the pinions $f^6$ $f^7$, shafts $f^4 f^5$, pulley $f^8$, the pulley-operating belt $f^9$, adapted to be tightened or permitted to run loose by contact with the belt-tightening pulley $f^{13}$, and said belt-tightening pulley $f^{13}$, substantially as set forth.

8. The combination, to form a means for lifting the ink-applying roller clear of the front and back edges of the die, of the pairs of rollers $d^7$ applied to the sides of the table, means, essentially such as set forth, for adjusting the set of said rollers longitudinally of the sides of the table, the table D, the ink-applying roller $f^2$, the journal $f^4$ of said roller, and the lifting-disks $f^{14}$ on said journal, substantially as set forth.

In testimony that we claim the foregoing as our invention we have hereunto signed our names.

GEORGE W. SWIFT, JR.
CHARLES T. PACKER.

Witnesses to the signature of George W. Swift, Jr.:
ELIZABETH A. SWIFT,
ANNIE THOMAS.

Witnesses to the signature of Charles T. Packer:
F. NORMAN DIXON,
A. E. PAIGE.